US012772214B2

(12) United States Patent
Zhao

(10) Patent No.: US 12,772,214 B2
(45) Date of Patent: Oct. 20, 2026

(54) MESSAGE PROCESSING METHOD, O-RU AND COMPUTER-READABLE STORAGE MEDIUM

(71) Applicant: SANECHIPS TECHNOLOGY CO., LTD., Shenzhen (CN)

(72) Inventor: Xin Zhao, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 265 days.

(21) Appl. No.: 18/696,970

(22) PCT Filed: Mar. 2, 2022

(86) PCT No.: PCT/CN2022/078911
§ 371 (c)(1),
(2) Date: Mar. 28, 2024

(87) PCT Pub. No.: WO2023/060822
PCT Pub. Date: Apr. 20, 2023

(65) Prior Publication Data

US 2024/0397486 A1 Nov. 28, 2024

(30) Foreign Application Priority Data

Oct. 12, 2021 (CN) .......................... 202111189257.2

(51) Int. Cl.
*H04W 72/1268* (2023.01)
*H04L 47/628* (2022.01)
(Continued)

(52) U.S. Cl.
CPC ......... *H04W 72/044* (2013.01); *H04L 47/628* (2013.01); *H04W 72/1268* (2013.01); *H04W 88/085* (2013.01)

(58) Field of Classification Search
CPC ........... H04W 72/044; H04W 72/1268; H04W 72/0453; H04W 88/085; H04W 28/16; H04L 47/628; H04B 7/0413; H04B 7/0686
See application file for complete search history.

(56) References Cited

U.S. PATENT DOCUMENTS

2008/0316922 A1* 12/2008 Riddle ................ H04L 41/0894 370/230
2021/0120531 A1* 4/2021 Jeon ....................... H04B 7/088

OTHER PUBLICATIONS

European Patent Office, the Extended European Search Report (EESR) dated Sep. 10, 2025, for corresponding EP application No. 22879773.4.

(Continued)

*Primary Examiner* — Jamal Javaid
(74) *Attorney, Agent, or Firm* — Li & Cai Intellectual Property (USA) Office

(57) ABSTRACT

A message processing method includes: obtaining frequency-domain in-phase quadrature (IQ) data according to uplink data, and storing the frequency-domain IQ data in a storage space; receiving a control plane message issued by an Open Radio Access Network Distributed Unit (O-DU), analyzing the control plane message to obtain a control plane parameter, and caching the control plane parameter in a queue corresponding to the control plane parameter in a queue group, M queues in the queue group stores control plane parameters of M symbols; reading the control plane parameter, and generating a user plane message transmission scheduling command according to the control plane parameter; reading the frequency-domain IQ data from the storage space according to the user plane message transmission scheduling command; and obtaining an uplink user plane (Continued)

message to be sent according to the read frequency-domain IQ data, and sending the uplink user plane message to the O-DU.

12 Claims, 7 Drawing Sheets

(51) Int. Cl.
*H04W 72/044* (2023.01)
*H04W 88/08* (2009.01)

(56) References Cited

OTHER PUBLICATIONS

Anonymous: "O-RAN Fronthaul Control, User and Synchronization Plane Specification," v7.0, O-RAN.WG4.CUS.0-v07.00, O-RAN Technical Specification, O-RAN Fronthaul Working Group dated Jul. 11, 2021.

* cited by examiner

MESSAGE PROCESSING METHOD, O-RU AND COMPUTER-READABLE STORAGE MEDIUM

CROSS REFERENCE TO RELATED APPLICATIONS

The present disclosure is a National Phase Application filed under 35 U.S.C. 371 as a national stage of PCT/CN2022/078911, filed on Mar. 22, 2022, and claims the priority of Chinese Patent Application No. 202111189257.2 filed on Oct. 12, 2021, the contents of which are incorporated herein by reference in their entirety.

TECHNICAL FIELD

Embodiments of the present disclosure relate to the technical field of communications, and in particular, to a message processing method, an Open Radio Access Network Radio Unit (O-RU), and a computer-readable storage medium.

BACKGROUND

With development of communication systems, a plurality of fronthaul interface protocols have been developed, such as the Common Public Radio Interface (CPRI) protocol, the evolved Common Public Radio Interface (eCPRI) protocol, and the Open Radio Access Network (ORAN) protocol. In order to support transmission of 5G mixed numerologies, a Control Plane (C-Plane) protocol of the ORAN fronthaul interface protocol specifies an arrangement manner of Resource Blocks (RBs) serial numbers and a uniform coding manner of slot timing serial numbers when a plurality of numerologies coexist. However, there is no technical means of uniformly scheduling during antennas transmissions of different subcarrier intervals at present, which makes it difficult to adapt to a scenario of mixed transmission of different numerologies.

SUMMARY

An embodiment of the present disclosure provides a message processing method applied to an Open Radio Access Network Radio Unit (O-RU), including: obtaining frequency-domain in-phase quadrature (IQ) data according to uplink data received by an antenna, and storing the frequency-domain IQ data in a preset storage space: receiving a control plane message issued by an Open Radio Access Network Distributed Unit (O-DU), analyzing the control plane message to obtain a control plane parameter, and caching the control plane parameter in a queue corresponding to the control plane parameter in a queue group: wherein M queues in the queue group are respectively used for storing control plane parameters of M symbols and the M symbols are in one-to-one correspondence with the M queues: reading the cached control plane parameter, and generating a user plane message transmission scheduling command according to the read control plane parameter; reading the frequency-domain IQ data from the storage space according to the user plane message transmission scheduling command; and obtaining an uplink user plane message to be sent according to the read frequency-domain IQ data, and sending the uplink user plane message to the O-DU.

An embodiment of the present disclosure further provides an O-RU, including: at least one processor; and a memory communicating with and connected to the at least one processor; wherein the memory stores instructions executable by the at least one processor, and the instructions are executed by the at least one processor to cause the at least one processor to perform the above message processing method.

An embodiment of the present disclosure further provides a computer-readable storage medium storing a computer program which, when executed by a processor, implements the above message processing method.

DETAIL DESCRIPTION OF EMBODIMENTS

Figure 1:
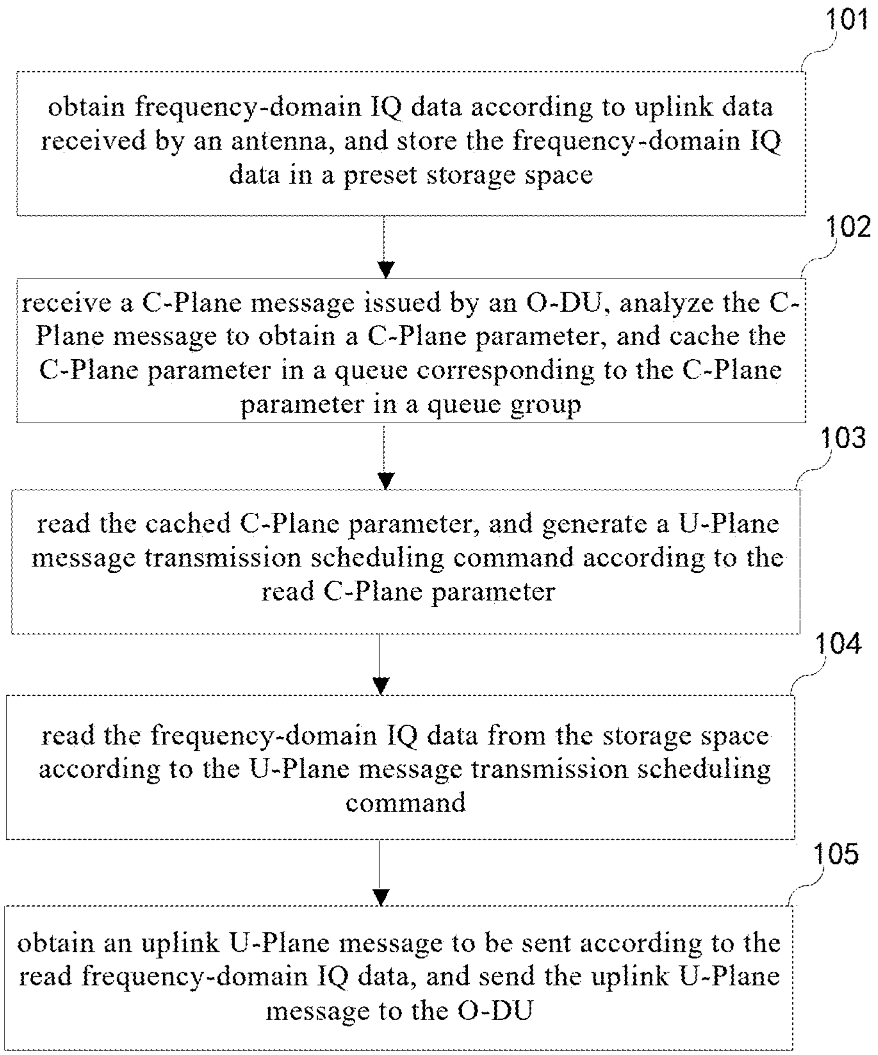
FIG. 1 is a flowchart of a message processing method according to an embodiment of the present disclosure.

A primary objective of embodiments of the present disclosure is providing a message processing method, an O-RU, and a computer-readable storage medium, so as to adapt to a scenario of mixed transmission of different numerologies.

In order to make objectives, technical solutions and advantages of the embodiments of the present disclosure clearer, the embodiments of the present disclosure will be described in detail below with reference to the accompanying drawings. However, it should be understood by those of ordinary skill in the art that many technical details are proposed in the embodiments of the present disclosure for enabling a better understanding of the present disclosure. However, the technical solutions claimed in the present disclosure can be implemented even in absence of those technical details and various changes and modifications based on the following embodiments. The division of the following embodiments is for convenience of description, and should not constitute any limitation to the specific implementations of the present disclosure, and if no conflict is incurred, the embodiments can be combined with each other and cross reference to the embodiments is also allowed.

For facilitating the understanding of the embodiments of the present disclosure, related technologies involved in the present disclosure is briefly introduced below.

In a Distributed Radio Access Network (D-RAN) system and a Centralized Radio Access Network (RAN) which may also be referred to as a Cloud-RAN, Remote Radio Units (RRUs) are usually installed in areas which need to be covered, and communicate with Base Band Units (BBUs) through one or more optical fibers. In such solution, the RRUs are infinitely close to antennas, which greatly reduce attenuation caused by feeder lines (that are connections between the antennas and the RRUs). Meanwhile, the BBUs are migrated and concentrated in a central machine room to form a BBU baseband pool, and the central machine room is connected to the RRUs through a fronthaul network formed by optical fiber links, which is very favorable to cooperation of cells, reduces attenuation caused during transmission, and saves cost.

With the development of communication systems, a plurality of fronthaul interface protocols have been developed, such as the CPRI protocol, the IR protocol, the eCPRI protocol, the Radio over Ethernet (RoE) protocol, and the ORAN protocol. The ORAN protocol was proposed by operators such as China Mobile in 2018, with an original intention of reducing cost of one-time equipment investment of a whole RAN system by separating non-real-time application software in the RAN system from dedicated hardware. Therefore, a primary deployment objective of an ORAN is each network element in a 5G RAN system. The ORAN is an extension based on existing network element interface protocols of 5G 3GPP for supporting a new requirement of openness, and the ORAN protocol includes: 4G/5G 3GPP protocols; and protocols and specifications newly added for purposes of openness and self-performance by the ORAN.

The ORAN fronthaul interface protocol is divided into a C-Plane protocol, a User Plane (U-Plane) protocol, a Synchronization Plane (S-Plane) protocol, and a Management Plane (M-Plane) protocol. If an extended cyclic prefix (CP) and a Multimedia Broadcast Multicast Service (MBMS) are not considered, a 4G Long Term Evolution (LTE) air interface has merely one physical layer waveform, that is, a subcarrier interval can merely be 15 KHz. 5G services use a frequency band with a large span and have various deployment manners, so that an Orthogonal Frequency Division Multiplexing (OFDM) numerology capable of being flexibly extended is needed. The 3GPP Release 15 protocol specifies five physical layer waveforms for a 5G air interface, with corresponding subcarrier intervals being 15 KHz, 30 KHz, 60 KHz, 120 KHz, and 240 KHz, respectively.

Slots and OFDM symbols of different numerologies are aligned in a time domain, which has great significance for a Time Division Duplexing (TDD) network. Selection of a numerology depends on many factors including deployment manner (Frequency Division Duplexing or TDD), carrier frequency, service requirements (delay, reliability and data rate), hardware quality (phase noise of a local crystal oscillator), mobility, and implementation complexity.

After more numerologies of large subcarrier intervals are designed based on the subcarrier interval of 15 KHz, the 5G New Radio (5G NR) can provide users with services having a strict requirement on the delay, such as ultra-reliable and low-latency communication (URLLC) services, which cannot be provided by the LTE. In all numerologies, an amount of OFDM symbols in each slot is the same (14 OFDM symbols/slots), which simplifies scheduling mechanism and reference signal design. Duration of the OFDM symbols is inversely proportional to the subcarrier intervals, and the delay is reduced when the larger subcarrier intervals are used.

In addition, since the maximum Fast Fourier Transform (FFT) sampling amount of an OFDM modulator and the subcarrier intervals determine a channel bandwidth, the numerology of a larger subcarrier interval needs a larger signal bandwidth, and the numerology of a smaller subcarrier interval needs a smaller signal bandwidth. A frequency band used by the 5G NR can be roughly divided into two bands: a frequency band less than 6 GHZ (sub 6 GHZ) which has a frequency range of 450 MHZ to 6000 MHZ, and a millimeter wave (mmWave) frequency band having a frequency range of 24250 MHz to 52600 MHZ. In the sub 6 GHz frequency band, the maximum bandwidth is 100 MHZ; and in the mmWave frequency band, the maximum bandwidth can reach 400 MHZ. Therefore, the numerologies of the subcarrier intervals of 15 KHz and 30 KHz can merely be used in the sub 6 GHz frequency band, the numerology of the subcarrier interval of 120 KHz can merely be used in the mmWave frequency band, and the numerology of the subcarrier interval of 60 KHz can be used in both of the two frequency bands.

It is found through research by the applicant of the present disclosure that: in order to support transmission of 5G mixed numerologies, the C-Plane protocol of the current ORAN fronthaul interface protocol specifies an arrangement manner of the RB serial numbers and a uniform coding manner of the slot timing serial numbers when a plurality of numerologies coexist, so as to enable multiplexing of a C-Plane message format during mixed transmission of different numerologies. However, the ORAN protocol does not propose any solution to how to schedule data of different antennas during the mixed transmission of different numerologies and how to achieve link delay compensation of each antenna in the mixed numerologies, resulting in poor timeliness of message transmission. In view of this, the embodiments of the present disclosure provide a message processing method applied to an O-RU; and the O-RU may also be understood as an RRU in the ORAN. The message processing method provided in the embodiments of the present disclosure can be applied to message transmission between a radio base station and the RRU in a scenario of 5G protocol mixed numerologies. The radio base station may also be understood as an O-DU. Implementation details of the message processing method provided in the embodiments are described below, the following description is merely for facilitating the understanding of the implementation details, and the implementation details are not a must for implementing the message processing method.

A flowchart of a message processing method according to a present implementation is shown in FIG. 1, and, the message processing method includes operations 101 to 105.

At the operation 101: frequency-domain IQ data is obtained according to uplink data received by an antenna, and the frequency-domain IQ data is stored in a preset storage space.

At the operation 102: a C-Plane message issued by an O-DU is received, the C-Plane message is analyzed to obtain a C-Plane parameter, and the C-Plane parameter is cached in a queue corresponding to the C-Plane parameter in a queue group, with M queues in the queue group being respectively used for storing C-Plane parameters of M symbols and the M symbols being in one-to-one correspondence with the M queues.

At the operation 103: the cached C-Plane parameter is read, and a U-Plane message transmission scheduling command is generated according to the read C-Plane parameter.

At the operation 104: the frequency-domain IQ data is read from the storage space according to the U-Plane message transmission scheduling command.

At the operation 105: an uplink U-Plane message to be sent is obtained according to the read frequency-domain IQ data, and the uplink U-Plane message is sent to the O-DU.

In the embodiments of the present disclosure, a scheduling strategy of data of different antennas is provided for a scenario of mixed transmission of different numerologies. By setting the queue group used for respectively storing the C-Plane parameters of the M symbols, and making the C-Plane parameters of different symbols correspond to different queues, caching of different C-Plane parameters is supported. Since the subcarrier interval is one included in the C-Plane parameter, different C-Plane parameters correspond to different subcarrier intervals, and different subcarrier intervals correspond to different numerologies. Therefore, the technical solution provided in the embodiments of the present disclosure may be applied to the scenario of mixed transmission of different numerologies. In the scenario of mixed transmission of different numerologies, by caching the C-Plane parameter obtained by the analysis in the queue corresponding to the C-Plane parameter in the queue group, different C-Plane parameters may be cached in the different queues in the queue group, and transmission commands for access to a data cache, i.e., U-Plane message transmission scheduling commands, may be generated after the C-Plane parameters cached in different queues are read. It should be understood that one or more U-Plane message transmission scheduling commands may be generated each time the C-Plane parameter cached in one queue is read, so that the frequency-domain IQ data may be sequentially read from the storage space according to a sequence of the U-Plane message transmission scheduling commands to obtain the uplink U-Plane message to be sent, and the uplink U-Plane message may be sent to the O-DU, thereby improving timeliness of message transmission in the scenario of mixed transmission of different numerologies.

At the operation 101, after an air interface antenna receives the uplink data from a user equipment (UE), the O-RU may perform medium-radio frequency time domain processing on the uplink data to obtain time-domain IQ data, and store the time-domain IQ data in the preset storage space which may be a Random Access Memory (RAM). Then, an FFT accelerator in the O-RU reads the time-domain IQ data cached in the RAM, performs FFT processing on the time-domain IQ data to convert the time-domain IQ data into the frequency-domain IQ data, and stores the frequency-domain IQ data in a designated address in the RAM. Different antennas may correspond to different designated addresses, for example, a corresponding relationship between serial numbers of the antenna and the designated addresses in the RAM may be established in advance and may be implemented as a preconfigured address table, and the designated address in the RAM where the frequency domain IQ data needs to be stored may be looked up in the address table.

At the operation 102, the O-RU may receive the C-Plane message sent by the O-DU, analyze the C-Plane message to obtain the C-Plane parameter, and cache the C-Plane parameter in the queue corresponding to the C-Plane parameter in the queue group. The queue may be a First Input First Output (FIFO) queue, that is, the C-Plane parameter may be cached in the FIFO queue corresponding to the C-Plane parameter obtained by the analysis in an FIFO group, and different C-Plane parameters may be stored in different FIFO queues. M FIFO queues in the FIFO group are respectively used for storing the C-Plane parameters of the M symbols corresponding to a unit subframe, and the M symbols are in one-to-one correspondence with the M FIFO queues. The unit subframe may be a 1 ms subframe, that is, the M FIFO queues in the FIFO group are respectively used for storing the C-Plane parameters of the M symbols corresponding to the 1 ms subframe.

In one example, the main C-Plane parameter obtained after analyzing the C-Plane message are as shown in Table 1 below.

TABLE 1

| Attribute | C-Plane Parameter | Bit Width (bits) | Meaning |
|---|---|---|---|
| eCPRI | eaxc_id | 16 | carrier/antenna serial number in ORAN processing channel |
| Common Header | dataDirection | 1 | data direction |
| | payloadVersion | 3 | payload version |
| | filterIndex | 4 | filter index |
| | frameId | 8 | frame serial number |
| | subframeId | 4 | subframe serial number |
| | slotId | 6 | slot serial number |
| | startSymbolid | 6 | start symbol serial number |
| | numberOfsections | 8 | amount of sections |
| | section Type | 8 | section type |
| | udCompHdr | 8 | user data compression header |
| | timeOffset | 16 | time offset |
| | frameStructure | 8 | frame structure |
| | cpLength | 16 | cyclic prefix length |
| | sectionId | 12 | section serial number |
| Section Fields | rb | 1 | resource block indicator |
| | symInc | 1 | command of increase of number of symbols |
| | startPrbc | 10 | start Physical Resource Block (PRB) described by data section |
| | reMask | 12 | resource block mask |
| | numPrbc | 8 | amount of consecutive PRBs described by each data section |
| | numSymbol | 4 | amount of symbols |
| | beamId | 15 | beam identifier |
| | ueId | 15 | UE identifier |
| | freqOffset | 24 | frequency offset |
| extended command | technology | 8 | system type |
| | . . . | . . . | . . . |

At the operation 103, each of a plurality of banks (i.e., processing units) of each ORAN processing channel in the O-RU may independently allocate a reference timing, and each bank reads the cached C-Plane parameter according to its reference timing, and the sequence of the U-Plane message transmission scheduling commands is generated according to the C-Plane parameters respectively read by the banks. It should be understood that, if the reference timing of each bank is different, a time point when each bank reads the cache C-Plane parameter is different, and a time point when the U-Plane message transmission scheduling command is generated is also different, so that the sequence of the U-Plane message transmission scheduling commands may be generated according to different generation time points of the U-Plane message transmission scheduling commands. Each bank has the independent timing, and the banks are subjected to round-robin scheduling, so that an independent time window scheduling delay configuration requirement may be met, and different banks may share a bus bandwidth to access the RAM.

In a specific implementation, when (i.e., a sending moment) and how (i.e., a sending mode) the uplink data (e.g., the uplink U-Plane message) to be sent is sent may be determined according to the C-Plane parameter, and therefore, the C-Plane parameter is integrated into one U-Plane message transmission scheduling command, so as to control transmission of the uplink U-Plane message.

At the operation 104, the O-RU may sequentially read the frequency-domain IQ data from the storage space, i.e., the RAM, according to the sequence of the message transmission scheduling commands.

At the operation 105, the O-RU may compress the frequency-domain IQ data taken from the RAM, and then add a U-Plane application layer message header to the compressed frequency-domain IQ data to complete U-Plane packing. During the U-Plane packing, a common message header, a section message header, and PRB domain fields may be added according to a U-Plane message structure. Then, the obtained U-Plane packet enters a transport layer for being processed, that is, a transport layer eCPRI message header or RoE message header is added to the U-Plane packet according to actual needs, thereby obtaining the uplink U-Plane message to be sent. Finally, the uplink U-Plane message of each ORAN processing channel is routed to a corresponding Ethernet interface through MAC-layer routing processing, and is transmitted to the O-DU through an Ethernet fronthaul network.

In one embodiment, the O-RU includes a plurality of ORAN processing channels, each of the ORAN processing channels includes a plurality of banks and supports configurations of a plurality of antennas, each antenna at least supports a processing capability of carriers from 5M bandwidth to 100M bandwidth. An amount of the ORAN processing channels in the O-RU, an amount of the banks in each ORAN processing channel, and an amount of the configurations of the antennas supported by each ORAN processing channel may be set according to actual needs. For example, an O-RU product supports 2 Ethernet interfaces with a line rate of 25 Gbps and is provided therein with 4 ORAN processing channels, each channel is divided into 8 banks and may support 64 configurations of antennas, and each antenna may be independently configured to use one of the 8 banks. Each antenna may support the processing capability of the carriers from 5M bandwidth to 100M bandwidth.

In a traditional fronthaul link, each transmission channel can support merely one subcarrier interval or numerology. According to the embodiments of the present disclosure, multiple subcarrier intervals, multiple numerologies, and a mixed mode of large-small bandwidths in one processing channel may be supported. A larger subcarrier interval is used for a service type with a higher timeliness requirement, and transmission through more antennas is supported in a small bandwidth scenario, so that antenna configuration resources may be fully used in the small bandwidth scenario, and a channel transmission bandwidth capacity may be fully used in a large bandwidth scenario, thereby balancing transmission timeliness, bandwidth utilization, and transmission through more antennas.

In one embodiment, each ORAN processing channel supports transmission of data of multiple systems, and the data of multiple systems at least includes any combination of: LTE, Narrow Band Internet of Things (NB-IoT), 5G NR, and Physical Random Access Channel (Prach). That is, in the embodiments, mixed transmission of the data of the different systems in one ORAN processing channel is supported, thereby realizing high applicability.

Figure 2:
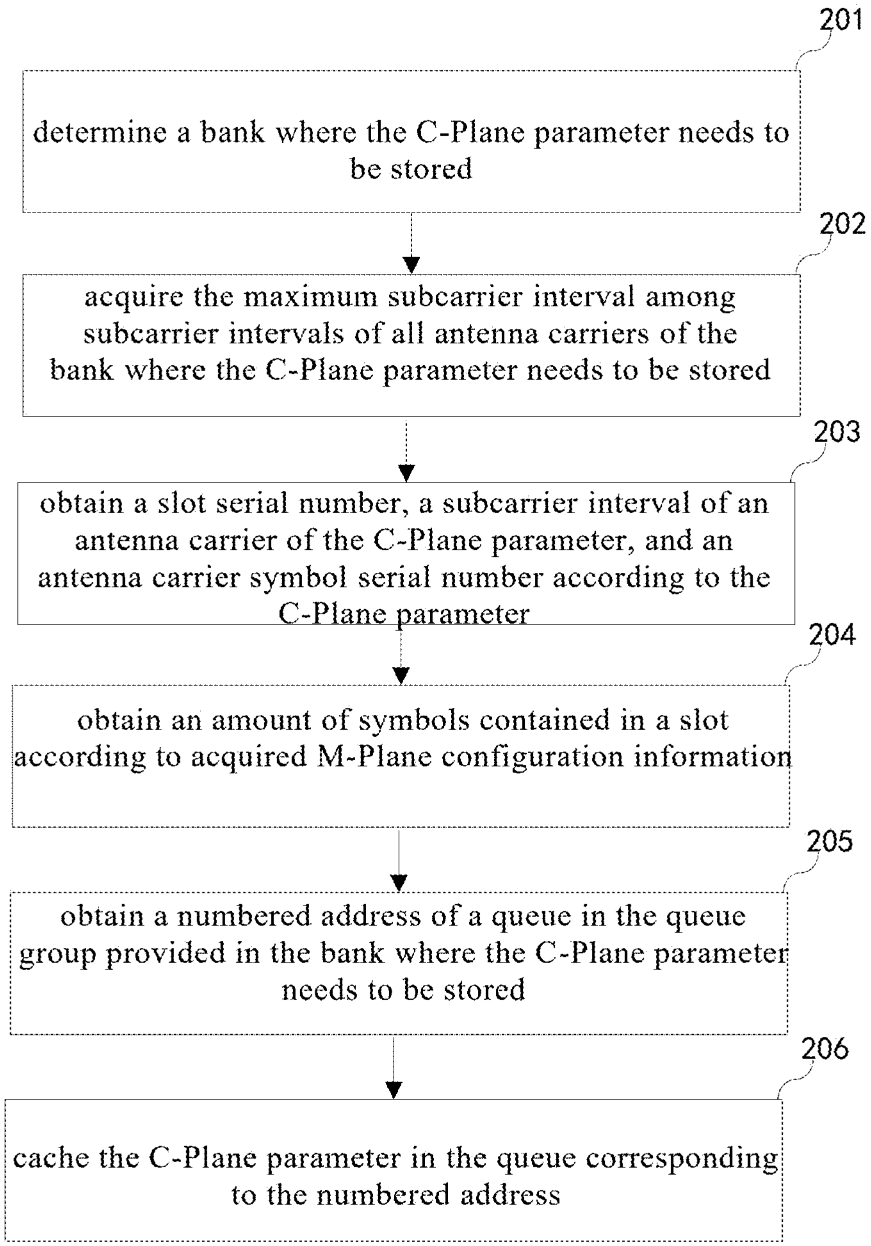
FIG. 2 is a flowchart of an implementation process of caching control plane parameters in a queue corresponding to the control plane parameters according to an embodiment of the present disclosure.

In one embodiment, the O-RU includes a plurality of banks, each bank is provided therein with a queue group, and caching the C-Plane parameters in the queue corresponding to the C-Plane parameter at the operation 102 may be implemented through the following operations with reference to FIG. 2.

At operation 201: a bank where the C-Plane parameter needs to be stored is determined.

At operation 202: the maximum subcarrier interval among subcarrier intervals of all antenna carriers within the bank where the C-Plane parameter needs to be stored is acquired.

At operation 203: a slot serial number, a subcarrier interval of an antenna carrier of the C-Plane parameter, and an antenna carrier symbol serial number are obtained according to the C-Plane parameter.

At operation 204: an amount of symbols contained in a slot is obtained according to acquired M-Plane configuration information.

At operation 205: a numbered address of the queue in the queue group provided in the bank where the C-Plane parameter needs to be stored is obtained according to the maximum subcarrier interval, the slot serial number, the subcarrier interval of the antenna carrier of the C-Plane parameter, the antenna carrier symbol serial number and the amount of the symbols contained in the slot.

At operation 206: the C-Plane parameter is cached in the queue corresponding to the numbered address.

In the embodiment, each queue in the queue group may be pre-configured with a numbered address, and the queue corresponding to the numbered address obtained at the operation 205 is taken as the queue corresponding to the C-Plane parameter, so that the C-Plane parameter may be stored in the queue corresponding to the numbered address. For obtaining the numbered address of the queue, the maximum subcarrier interval, the slot serial number, the subcarrier interval of the antenna carrier of the C-Plane parameter, the antenna carrier symbol serial number, and the amount of the symbols contained in the slot are all taken into consideration, so that it facilitates normalize different numerologies into addresses with a set of uniform timing references, and normalize symbol timing differences between different subcarrier intervals thus the uniform timing references may improve system synchronism, that is, improving synchronism of message transmission.

At the operation 201, each antenna carrier may select a bank for storing the corresponding C-Plane parameter in a FIFO group of the bank through pre-configuration, that is, a corresponding relationship between different banks and different C-Plane parameters is set in advance, and the bank where the C-Plane parameter currently obtained by the analysis needs to be stored may be determined according to the corresponding relationship.

At the operation 202, the O-RU may acquire the maximum subcarrier interval among the subcarrier intervals of all the antenna carriers within the bank where the C-Plane parameter needs to be stored, that is, acquire the maximum subcarrier interval of all the antenna carriers within the bank.

At the operation 203, the slot serial number slotId, the subcarrier interval carrier_scs of the antenna carrier of the C-Plane parameter, and the antenna carrier symbol serial number symId may be obtained according to the C-Plane parameter. In a specific implementation, slotId, carrier_scs, and symId may be obtained from fields of the C-Plane parameter obtained by the analysis.

At the operation 204, the amount of the symbols contained in the slot symNum may be acquired from the M-Plane configuration information.

At the operation 205, the numbered address of the queue may be calculated by the following formula:

$$\text{carrier\_fifo\_addr} = slotId * symNum + \text{max\_scs}/\text{carrier\_scs} * (symId + 1/2)$$

where carrier_fifo_addr is the calculated numbered address of the queue, slotId is the slot serial number, symNum is the amount of the symbols contained in the slot, max_scs is the maximum subcarrier interval, carrier_scs is the subcarrier interval of the antenna carrier of the C-Plane parameter, and symId is the antenna carrier symbol serial number. When the queue is the FIFO queue, carrier_fifo_addr may be understood as an FIFO numbered address where the C-Plane parameter of the antenna carrier is stored in the FIFO group within the bank, that is, a cache address of the C-Plane parameter.

By calculating the FIFO numbered address for caching through the above formula, on the one hand, the C-Plane parameters may be sorted according to the symbols, and a delay jitter of the C-Plane message during fronthaul network transmission may be absorbed; and on the other hand, the C-Plane parameters of different subcarrier intervals may be mapped to the FIFO group for caching with a set of uniform timing references, and the symbol timing differences between different subcarrier intervals may be normalized.

In one embodiment, analyzing the C-Plane message to obtain the C-Plane parameter at the operation 102 includes: analyzing a common message header in the C-Plane message according to byte bit positions through a hardware circuit in the O-RU to obtain the C-Plane parameter in the common message header, with the C-Plane parameter in the common message header including: timing information, an amount of sections, and a section type; and analyzing each section and extension field information in the C-Plane message according to different message types based on the section type and the amount of sections to obtain the C-Plane parameter in each section and the extension field information. The hardware circuit in the O-RU may be an Integrated Circuit (IC) chip or a Field-Programmable Gate Array (FPGA) which is specifically designed for analyzing the message.

In the embodiment, the analysis method of the C-Plane parameter may be understood as a hardware-logic (i.e., the hardware circuit) analysis method in which, each time one C-Plane message is received, by referring to the Table 1, the hardware circuit first analyzes the common message header according to the byte bit positions to obtain the timing information such as the frame serial number (frameId), the subframe serial number (subframeId), the slot serial number (slotId), the start symbol serial number (startSymbolId) of the message, and obtain fields such as the amount of sections (numberOfsections) and the section type (sectionType). Then, according to the section type, each section (i.e., the Section Fields) and extended field information (i.e., the extended command) are analyzed according to different message types until all sections of the message are analyzed.

In one example, the hardware circuit may obtain message timing information carried in an application layer message header, count whether the message is received on time within a time window according to time window configuration in the M-Plane configuration information, and count an amount of messages that are received earlier and later. The messages that are received earlier and later are discarded.

In one embodiment, analyzing the C-Plane message to obtain the C-Plane parameter at the operation 102 includes: performing message field analysis according to a message structure of the C-Plane message through a CPU soft core in the O-RU to obtain the C-Plane parameter. For example, the hardware circuit in the O-RU may write the received C-Plane message in the storage space, i.e., the RAM, in a pass-through manner, and inform the CPU soft core, and the CPU soft core performs message field analysis according to the message structure of the C-Plane message to obtain the C-Plane parameter. After the CPU soft core obtains the C-Plane parameter through the analysis, the CPU soft core may send the C-Plane parameter obtained through the analysis to the hardware circuit.

In the embodiment, the analysis method of the C-Plane parameter may be understood as: a software-logic (i.e., the CPU soft core) analysis method. With the software-logic analysis method, the hardware circuit writes the received C-Plane message in the data cache RAM in the pass-through manner, and simultaneously informs the CPU soft core through interruption, and software logic performs the message field analysis according to the message structure, and sends an analysis result to hardware logic. The software-logic analysis method may easily support upgrading of the ORAN protocol, and has a higher requirement on timeliness of software.

In the embodiment, the analysis of the C-Plane message by the hardware logic is supported, and a processing channel for software analysis of the C-Plane message is also provided. The analysis the C-Plane parameter by the hardware logic meets a requirement in a high-timeliness message processing scenario. Through the analysis the C-Plane parameter by software, on the one hand, a new characteristic of the protocol, which cannot be supported by the solidified hardware logic, may be supported by software in subsequent evolution and upgrading of the ORAN protocol, and on the other hand, a soft analysis interface may also be used for a self-loop test of the hardware logic, thereby enabling a self-loop test of the O-RU in a scenario where the O-RU is not connected to the O-DU.

In one embodiment, reading the cached C-Plane parameter at the operation 103 includes: determining a bank where the C-Plane parameter is stored: determining a reference timing of the bank where the C-Plane parameter is stored according to an air interface timing and a link transmission delay of the bank where the C-Plane parameter is stored; and reading the cached C-Plane parameter according to the reference timing. A reference timing source at the side of the O-RU may acquire a network reference timing through an S-Plane timing synchronization protocol by means of 1588, SyncE or GPS, and the air interface timing is obtained according to the network reference timing. Link transmission delays of different banks may not be completely the same, so that different banks may be independently configured with the reference timings according to the air interface timing and the link transmission delays of different banks, so as to enable different banks to sequentially read cached C-Plane parameters according to the respective reference timings. The independently configured reference timing of each bank may also be understood as a read-side timing, that is, the read-side timing of each bank may be configured independently, so that the transmission command for access to the data cache, that is, the U-Plane message transmission scheduling command, may be generated after the C-Plane parameter is read.

In the embodiment, flexible message transmission delay scheduling and delay compensation management are supported, each ORAN processing channel may support the plurality of banks therein, each bank may adopt a different reference timing, and it is supported inside each bank that delays between antennas are multiples of the minimum delay, so that a scheduling delay of each carrier antenna may be flexibly configured. Meanwhile, each bank may also support out-of-order rearrangement of the received C-Plane messages, so even if the C-Plane messages are out-of-order, a corresponding U-Plane message may be transmitted at a designated symbol according to a frame structure preset by the O-DU. In addition, the data cache RAM may assist a stable window in absorbing a delay of a downlink U-Plane message which arrives earlier, and can also be used as an IQ data cache space for uplink delay compensation.

In one embodiment, reading the frequency-domain IQ data from the RAM according to the U-Plane message transmission scheduling command at the operation 104 includes: obtaining a start serial number of a PRB, an amount of RBs in the PRB, and a pre-configured regional address of an antenna carrier in the storage space according to the U-Plane message transmission scheduling command: calculating a storage address of the PRB in the storage space according to the start serial number of the PRB, the amount of the RBs in the PRB, and the pre-configured regional address of the antenna carrier in the storage space; and reading the frequency-domain IQ data from the storage address of the PRB in the storage space. The U-Plane message transmission scheduling command may carry the start serial number of the PRB, the amount of the RBs in the PRB, and the pre-configured regional address of the antenna carrier in the storage space, so that the storage address of the PRB in the data cache RAM may be calculated according to data carried in the U-Plane message transmission scheduling command, and then the frequency-domain IQ data may be read from the storage address.

In one embodiment, calculating the storage address of the PRB in the storage space according to the start serial number of the PRB, the amount of the RBs in the PRB, and the pre-configured regional address of the antenna carrier in the storage space includes: in a case where a data length corresponding to the amount of the RBs exceeds the maximum Ethernet message length, performing application layer slicing to split the C-Plane parameter into a plurality of C-Plane sub-parameters, and recalculating a start serial number of a PRB of each slice and an amount of RBs in the PRB of each slice; and calculating the storage address of the PRB in the storage space according to the recalculated start serial number of the PRB of each slice, the recalculated amount of the RBs in the PRB of each slice, and the pre-configured regional address of the antenna carrier in the storage space. That is, when generating the U-Plane transmission command, it needs to be determined whether a data size corresponding to the amount of the RBs in the PRB exceeds the maximum Ethernet message length, and if one PRB includes excessive RBs, the application-layer slicing needs to be performed to split one C-Plane parameter into a plurality of C-Plane sub-parameters, and the start serial number of the PRB of each slice and the amount of the RBs in the PRB of each slice need to be recalculated.

Figure 3:
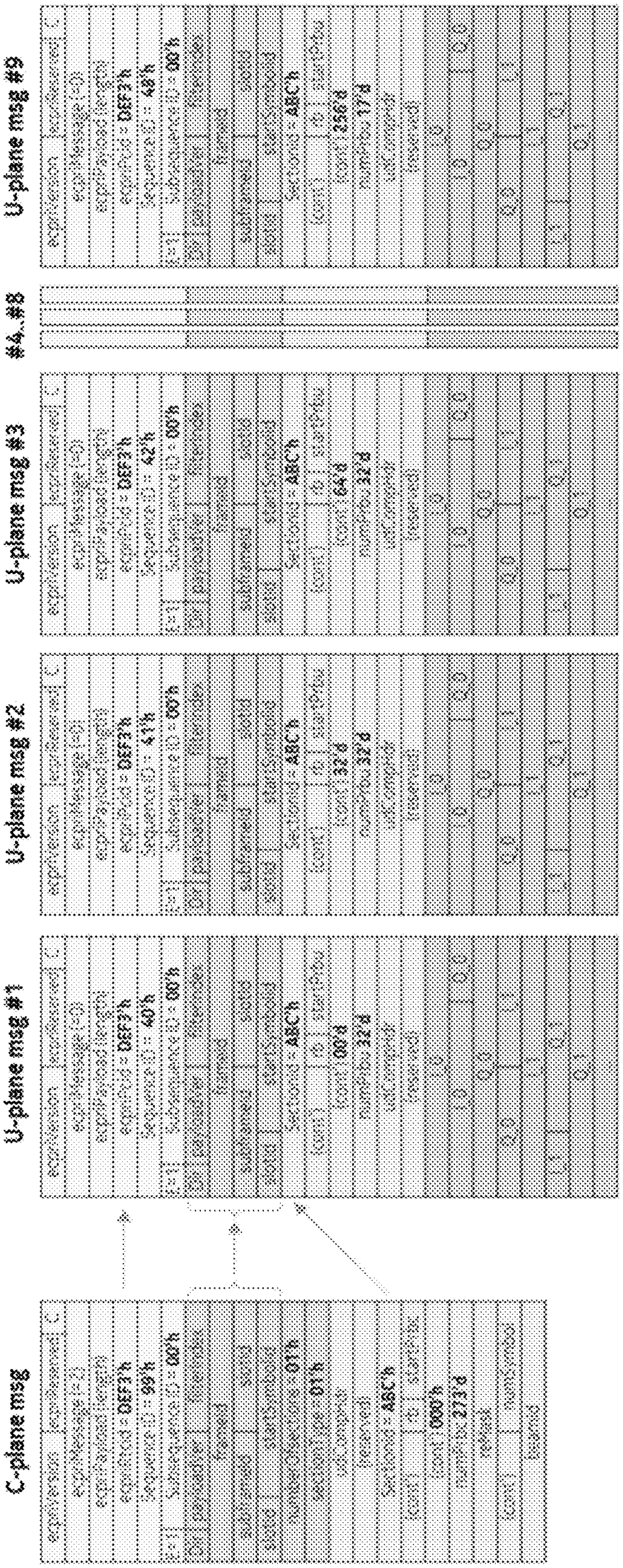
FIG. 3 is a schematic diagram of slicing of an application layer according to an embodiment of the present disclosure.

In one example, an effect of the application layer slicing may be as shown in FIG. 3: for one antenna carrier of 100M bandwidth, a frequency domain data size of one symbol is 273 RBs, the symbol is split into 9 slices according to 32 RBs, each of first 8 slices contains 32 RBs, the last slice contains 17 RBs, and the 9 slices belong to a same section and have a same section serial number. In FIG. 3, identifiers of the 9 slices are: U-plane msg #1, U-plane msg #2, U-plane msg #3, U-plane msg #4 . . . U-plane msg #9, the same section serial number SectionId of the 9 slices is ABC'h.

In the embodiment, one U-Plane packet including an excessive amount of RBs may be avoided through the application layer slicing. The C-Plane parameter is split into the plurality of C-Plane sub-parameters, a plurality of U-Plane message transmission scheduling commands may be generated according to the plurality of C-Plane sub-parameters, one C-Plane sub-parameter may be corresponding to one U-Plane message transmission scheduling command, that is, the plurality of U-Plane message transmission scheduling commands may be generated according to one C-Plane parameter, and scheduling may be performed through the plurality of U-Plane message transmission scheduling commands, which is beneficial to an increase in scheduling speed and an increase in data transmission speed. In a specific implementation, if one C-Plane parameter is not split, one U-Plane message transmission scheduling command may be generated according to such C-Plane parameter.

In one embodiment, the C-Plane parameters include: a compression mode and a compression bit width of each section. Obtaining the uplink U-Plane message to be sent according to the read frequency-domain IQ data at the operation 105 includes: performing compression processing on the read frequency-domain IQ data according to the compression mode and the compression bit width of each section to obtain compressed IQ data; and obtaining the uplink U-Plane message to be sent according to the compressed IQ data. In the embodiment, it is supported that a plurality of sections use different compression modes and different compression bit widths, thereby realizing high flexibility and facilitating meeting different transmission requirements.

Performing the compression processing on the read frequency-domain IQ data may be performing the compression processing on the read frequency-domain IQ data by any one of six compression algorithms defined by the ORAN protocol. For example, the compression processing may be performed by a Block Floating Point (BFP) compression algorithm. In general, 12 pieces of IQ data form one RB, the BFP compression algorithm takes 1 RB as a unit, a maximum effective data bit width is determined according to a piece of the data which has a largest absolute value among 12 pieces of I data and 12 pieces of Q data, a compression factor is calculated according to the compression bit width and a maximum effective bit width of actual data, and the data is compressed by being shifted to right by the compression factor.

In the embodiment, dynamic compression configuration is supported, and the IQ data of each section may be compressed according to the compression mode and the compression bit width of each section in the C-Plane parameter. In the embodiment, it is supported that the data of the RBs in each symbol are divided into a plurality of sections and the sections use different compression modes and different compression bit widths, and it is also supported that the compression modes and the compression bit widths may be re-configured online in real time. The compression modes and the compression bit widths may be switched online in real time according to a link bandwidth and transmission quality requirements of different users and different service types, thereby realizing dynamic balance between transmission bandwidth and quality of service.

In order to facilitate the understanding of the present embodiment, the message processing method according to the present embodiment is illustrated below by an exemplary scenario.

It is assumed that the O-RU product supports 2 Ethernet interfaces with the line rate of 25 Gbps and is provided therein with 4 ORAN processing channels, each channel is divided into 8 banks and may support 64 antenna configurations, and each antenna may be independently configured to use one of the 8 banks. Each antenna may support the processing capability of carriers from 5M bandwidth to 100M bandwidth.

Figure 4:
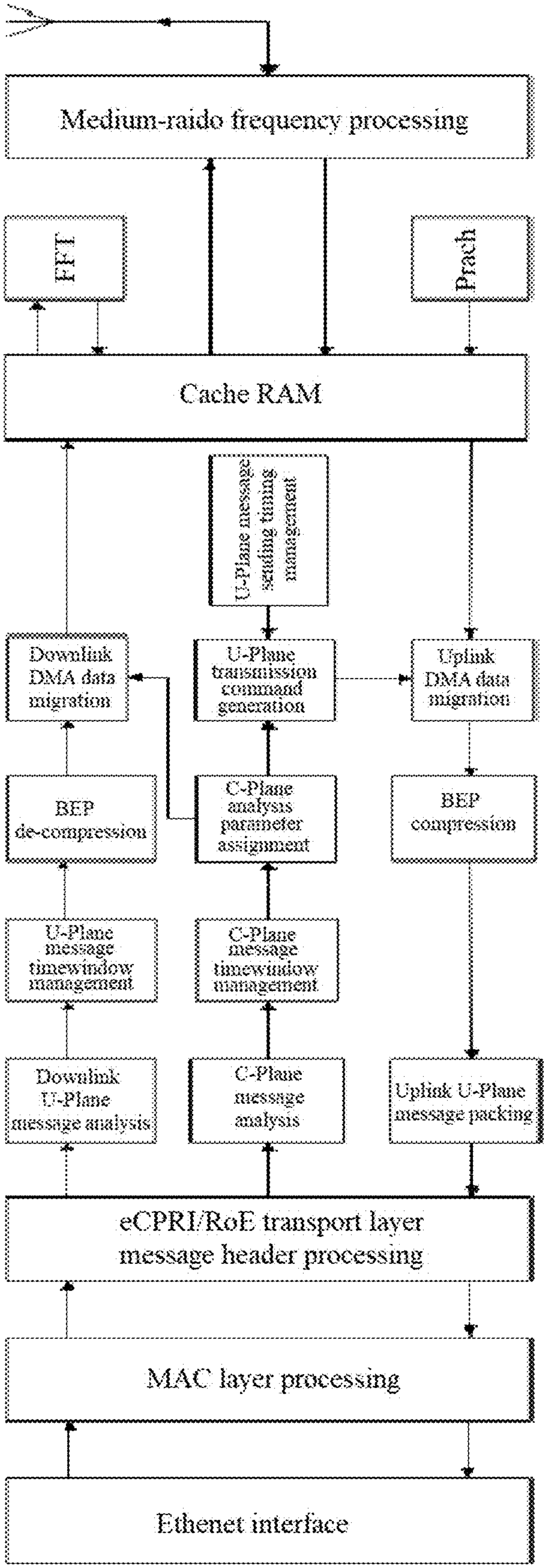
FIG. 4 is a structural diagram of an implementation of a message transmission method according to an embodiment of the present disclosure.
Figure 5:
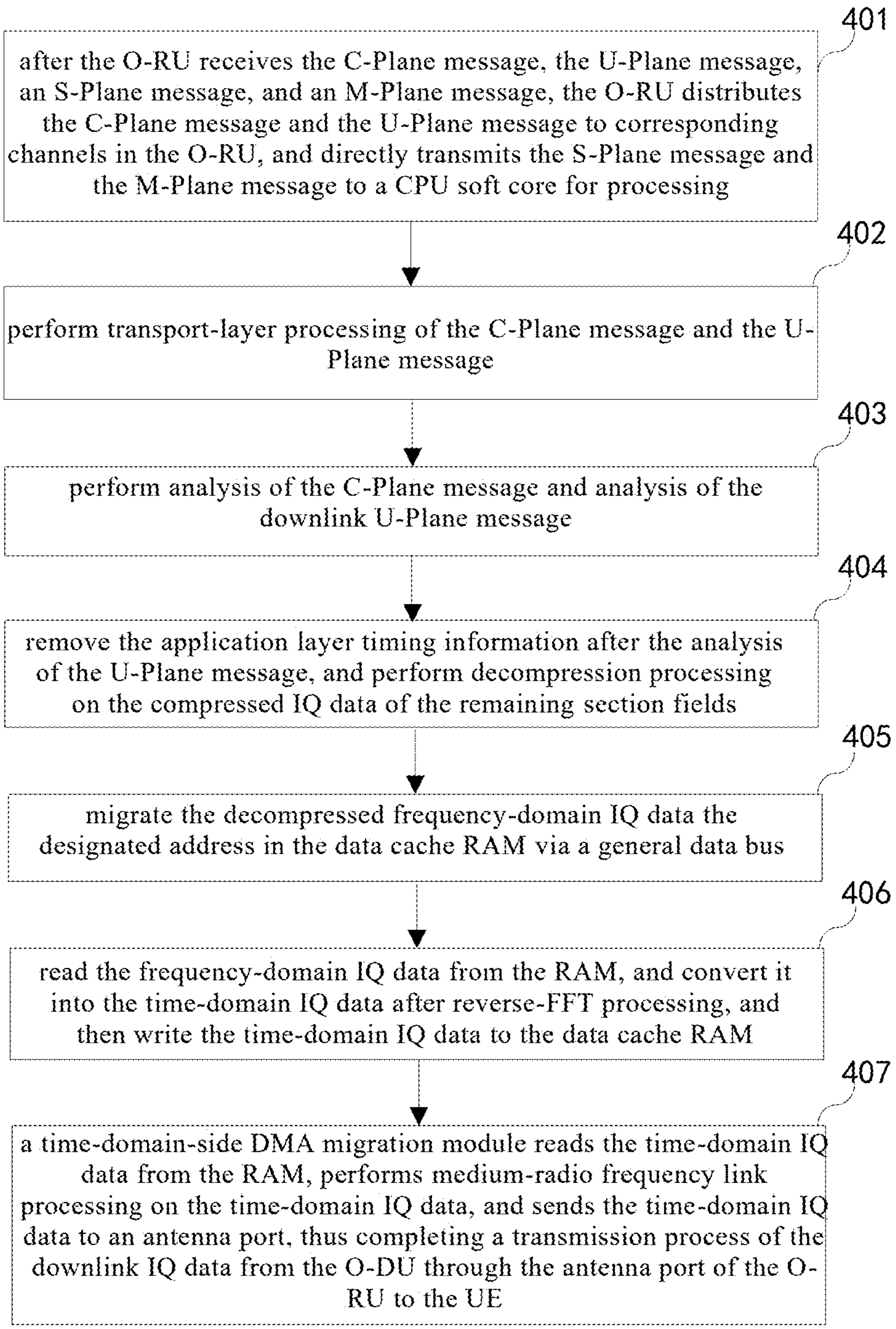
FIG. 5 is a flowchart of message processing in a downlink O-RU receiving direction according to an embodiment of the present disclosure.

In one embodiment, the message processing method of the present disclosure may be implemented by the architecture diagram shown in FIG. 4, and the message processing method includes message processing in a downlink O-RU receiving direction, which, with reference to FIG. 5, includes the following operations 401 to 407.

At the operation 401, after the O-RU receives the C-Plane message, the U-Plane message, an S-Plane message, and an M-Plane message, the O-RU distributes the C-Plane message and the U-Plane message to corresponding channels in the O-RU, and directly transmits the S-Plane message and the M-Plane message to the CPU soft core for processing.

The C-Plane message, the U-Plane message, the S-Plane message, and the M-Plane message sent by the downlink O-DU to the O-RU are sent to the 2 Ethernet interfaces of the O-RU through the Ethernet fronthaul network. After receiving the ORAN messages, the O-RU performs Ethernet MAC-layer exchange processing to distribute the C-Plane message and the U-Plane message to the corresponding channels of the O-RU according to the fields such as MAC address, VLAN id, port number or eAxC id, and directly transmits the S-Plane message and the M-Plane message to the CPU soft core for processing.

At the operation 402, transport layer processing of the C-Plane message and the U-Plane message is performed.

In FIG. 4, eCPRI/RoE transport layer message header processing may be taken as the processing at the operation 402. Unlike the S-Plane message and the M-Plane message which are encapsulated as standard Ethernet messages, the C-Plane message and the U-Plane message have an optional IP layer and a transport layer, which is encapsulated according to the eCPRI protocol or the RoE-protocol, encapsulated on an Ethernet layer L2. When the C-Plane message or the U-Plane message is subjected to transport layer message header processing, an Ethernet MAC layer message header and an IP layer message header are obtained first, and VLAN is removed to obtain a transport layer message. Then a transport layer message header is obtained according to a difference between an eCPRI transport layer protocol and an RoE transport layer protocol, and transport layer fields defined by the ORAN protocol are obtained.

The transport layer processing mainly includes analyzing the fields such as eAxC_ID and Message Type defined by the ORAN protocol in the eCPRI/RoE protocol, mapping eAxC_ID as antenna serial numbers of each internal ORAN processing channel, and respectively sending the C-Plane message and the U-Plane message to the corresponding banks.

At the operation 403, analysis of the C-Plane message and analysis of the downlink U-Plane message are performed.

Application layer message fields may be analyzed according to the definitions in the ORAN protocol. Each of a C-Plane application-layer message and a U-Plane application-layer message according to the ORAN protocol includes a common message header and a section message header, and the U-Plane message further includes an additional PRB field for transmission of frequency-domain RB data. Each of the C-Plane message and the U-Plane message includes one common message header and at least one section message header, each section message header of the U-Plane message is immediately followed by a PRB data section, and message fields of each section of the C-Plane message may be further appended extension fields (i.e., Section Extension Commands). The analysis of the C-Plane message may support two methods, i.e., the hardware-logic analysis method and the software-logic analysis method. Both the hardware-logic analysis method and the software-logic analysis method are described above, and thus will not be repeated here.

Time management of the U-Plane message and time management of the C-Plane message may be understood as: after the hardware-logic acquires message timing information carried in an application layer message header (a U-Plane application layer message header or a C-Plane application layer message header), the hardware-logic counts whether the U-Plane message or the C-Plane message is received on time within a time window according to time window configuration of the M-Plane message, and counts the amount of messages that are received earlier and later. The messages that are received earlier and later are discarded.

At the operation 404, the application layer timing information is removed after the analysis of the U-Plane message, and decompression processing is performed on the compressed IQ data of the remaining section fields (i.e., BFP decompression in FIG. 4).

The decompression processing may be BFP decompression processing, or other decompression processing methods. BFP decompression is a reverse process of BFP compression. According to a compression factor and compressed data transmitted in the sections of the U-Plane message, the I data and the Q data are shifted to left by the compression factor to restore to non-compressed data. After being decompressed, the IQ data of the U-Plane message may be sent to a downlink Direct Memory Access (DMA) data migration module in the O-RU.

Assignment of C-Plane analysis parameter in FIG. 4 is: after the analysis of the C-Plane message is performed, message parameter information, i.e., the C-Plane parameter, is obtained, and the C-Plane parameter is respectively sent to an uplink transmission command generation module and the downlink DMA data migration module via an uplink and a downlink. The C-Plane parameter may include an uplink C-Plane parameter and a downlink C-Plane parameter, the uplink C-Plane parameter is sent to the U-Plane transmission command generation module, and the downlink C-Plane parameter is sent to the downlink DMA data migration module.

At the operation 405, the decompressed frequency-domain IQ data is migrated to the designated address in the data cache RAM via a general data bus (i.e., downlink DMA data migration in FIG. 4).

The operation 405 may be performed by the DMA data migration module in the O-RU, the DMA data migration module mainly performs the functions of read-write access control of the data cache RAM, data bit width conversion, big-little endian conversion, and transmission flow control. Each section of the U-Plane message includes an RB serial number of a PRB at the beginning of a symbol and RB amount information of the PRB. When DMA data migration is performed, the decompressed RB data blocks are stored in the designated position in the data cache RAM according to the start serial number of the PRB in each section and an address partition of each antenna in the data cache RAM.

At the operation 406, the frequency-domain IQ data is read from the RAM, and is converted into the time-domain IQ data after reverse-FFT processing, and then the time-domain IQ data is written to the data cache RAM.

The operation 406 may be performed by the FFT accelerator in the O-RU.

At the operation 407, a time-domain-side DMA migration module reads the time-domain IQ data from the RAM, performs a medium-radio frequency link processing on the time-domain IQ data, and sends the processed time-domain IQ data to an antenna port, thus completing a transmission process of the downlink IQ data from the O-DU through the antenna port of the O-RU to the UE.

Figure 6:
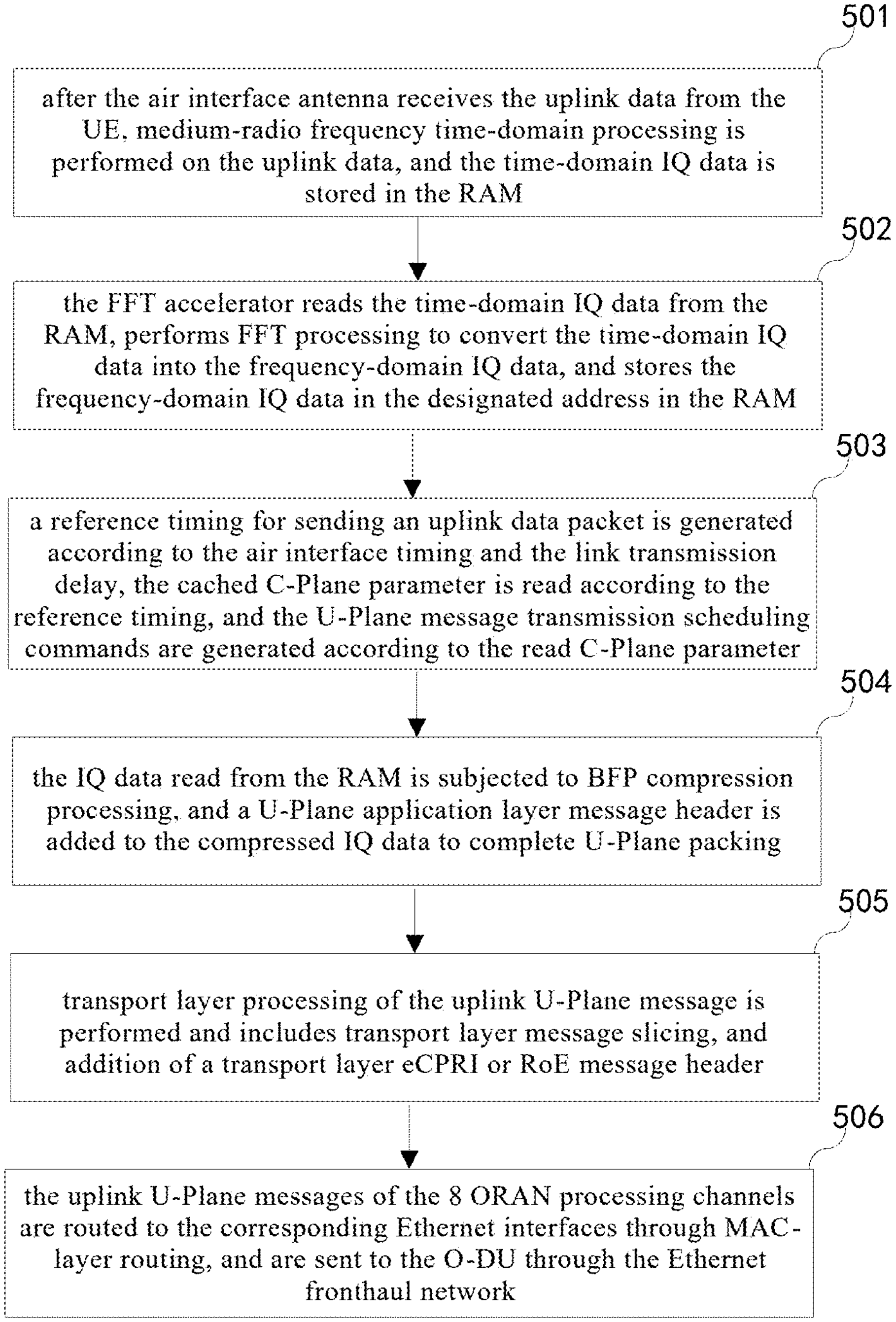
FIG. 6 is a flowchart of message processing in an uplink O-RU sending direction according to an embodiment of the present disclosure.

In one embodiment, the message processing method includes message processing in an uplink O-RU sending direction, which, with reference to FIG. 6, includes the following operations 501 to 506.

At the operation 501, after the air interface antenna receives the uplink data from the UE, medium-radio frequency time-domain processing is performed on the uplink data, and the time-domain IQ data is stored in the RAM.

At the operation 502, the FFT accelerator reads the time-domain IQ data from the RAM, performs FFT processing to convert the time-domain IQ data into the frequency-domain IQ data, and stores the frequency-domain IQ data in the designated address in the RAM.

In a specific implementation, a Prach accelerator may acquire Prach data from the time-domain IQ data, the Prach data may be converted into frequency-domain Prach data through FFT processing, and the frequency-domain Prach data is stored in the designated address in the RAM.

At the operation 503, a reference timing for sending an uplink data packet is generated according to the air interface timing and the link transmission delay, the cached C-Plane parameter is read according to the reference timing, and the U-Plane message transmission scheduling commands are generated according to the read C-Plane parameter.

Generating the reference timing for sending the uplink data packet is sending timing management of U-Plane message in FIG. 4. When the U-Plane message scheduling commands are generated (i.e., generation of U-Plane transmission commands in FIG. 4), application layer unpacking is performed according to the M-Plane configuration information. An uplink DMA migration module sequentially reads the frequency-domain IQ data from the RAM according to the sequence of the U-Plane message transmission scheduling commands (i.e., uplink DMA data migration in FIG. 4).

The operation 503 mainly includes (1) caching of the C-Plane parameter, (2) sending timing scheduling by U-Plane, (3) generation of the U-Plane message transmission scheduling commands, and (4) application layer slicing, which will be described in sequence below.

(1) Caching of the C-Plane Parameter

Before the O-RU sends the uplink U-Plane message, the O-DU sends the corresponding C-Plane message to the O-RU. After the C-Plane message is analyzed, the corresponding C-Plane parameters are obtained, and a plurality of sections in each message is split into independent C-Plane parameters. The main C-Plane parameters obtained after the C-Plane message is analyzed may be found in the above Table 1. The C-Plane parameters obtained by each ORAN processing channel through analysis are respectively written to the parameter cache FIFO group according to the timing information, the FIFO group respectively stores the C-Plane parameters of the M symbols corresponding to the 1 ms subframe by taking a symbol as a unit, and the M symbols are in one-to-one correspondence with the M FIFO queues. Each channel is provided with 8 banks. Each antenna carrier may select a blank for storing the C-Plane parameters of the carrier in a parameter cache FIFO group in the bank through configuration. In order to realize mixed transmission of carriers with different subcarrier intervals (one subcarrier interval may be taken as one numerology), when storing the C-Plane parameters in the FIFO queue, a sequence serial number of the FIFO queue is calculated by the following formula:

$$\text{carrier\_fifo\_addr} = slotId * symNum + \text{max\_scs/carrier\_scs} * (symId + 1/2).$$

The formula is described above, and thus will not be repeated here.

(2) Sending Timing Scheduling by U-Plane

The 8 banks of each ORAN processing channel may be independently allocated a timing, and each bank may support mixed transmission of 3 subcarrier intervals, but the specific implementations of the present disclosure are not limited to 3 subcarrier intervals. For example, the reference timing source at the side of the O-RU acquires the network reference timing through the S-Plane timing synchronization protocol by means of 1588, SyncE or GPS, and the air interface timing is obtained according to the network reference timing. The read-side timing, i.e., the reference timing, of each bank is configured according to the link processing delays of the different banks and the air interface timing, so as to generate the transmission commands for access to the data cache after the C-Plane parameters are read. Each bank can support configuration of 3 subcarrier intervals such as 15 kHz, 30 kHz and 60 kHz, each carrier can be allocated to a certain bank through selection. In a same bank, symbol-level delay differences may be supported among a plurality of carriers. In this way, the 8 banks have the independent timings, and are subjected round-robin scheduling, so that the independent time window scheduling delay configuration requirement can be met, and the different banks may share a bus bandwidth to access the RAM.

(3) Generation of the U-Plane Message Transmission Scheduling Commands

When the U-Plane transmission commands are generated, firstly, according to the reference timing of each bank, the C-Plane parameters are sequentially read from the FIFO group according to symbol timings, then the C-Plane parameters are analyzed, the storage address of the PRB in the RAM is calculated according to the start serial number of the PRB and the RB amount information the PRB which are described in the parameters, and the regional address of the antenna carrier in the RAM which is configured by software, and the frequency-domain IQ data is read from the storage address by the DMA data migration module.

(4) Application Layer Slicing

When generating the U-Plane transmission commands, it may be determined whether the data size corresponding to the amount of the RBs in the PRB exceeds the maximum Ethernet message length, and if one PRB includes excessive RBs, the application-layer slicing may be performed to split one C-Plane parameter into a plurality of C-Plane parameters, and the start serial number of the PRB in each slice and the amount of the RBs in the PRB in each slice may be recalculated.

At the operation 504, the IQ data read from the RAM is subjected to BFP compression processing, and a U-Plane application layer message header is added to the compressed IQ data to complete U-Plane packing (i.e., uplink U-Plane packing in FIG. 4).

The U-Plane packing is a reverse process of downlink U-Plane unpacking, and the common message header, the section message header and the PRB domain fields may be added according to the U-Plane message structure.

At the operation 505, transport layer processing of the uplink U-Plane message is performed and includes transport layer message slicing, and addition of a transport layer eCPRI or RoE message header.

At the operation 506, the uplink U-Plane messages of the 8 ORAN processing channels are routed to the corresponding Ethernet interfaces through MAC-layer routing, and are sent to the O-DU through the Ethernet fronthaul network.

In the embodiment, timing scheduling of each antenna in the numerologies and link delay compensation may be realized, and dynamic real-time switching of the compression modes and mixed transmission of multiple systems may be supported.

Taking a typical scenario as an example, according to the embodiments of the present disclosure, when a clock dominant frequency of the hardware logic is 737.28 MHZ, a single ORAN transmission channel may support 64 antenna carriers with a bandwidth of 20M or 12 antenna carriers with a bandwidth of 100M. In the case of the bandwidth of 100M, the transmission efficiency is the maximum, the effective bandwidth of pure IQ data (excluding ORAN message header, eCPRI message header, and MCA-layer message header) is 35.2 Gbps, and the maximum transmission bandwidth of one transmission channel is 47.2 Gbps, so the maximum transmission efficiency of the pure IQ data is 74.6%. In fact, during the transmission under the ORAN interface protocol, each U-Plane IQ message includes the Ethernet message header, a transport layer message header, an application layer message header, and information such as the compression factor of each section, and further includes packet intervals between messages, and all the included information at least occupies 5% of the transmission bandwidth. Therefore, the maximum transmission efficiency according to the embodiments of the present disclosure may reach more than 80%.

It should be noted that the above examples in the embodiments of the present disclosure are merely for facilitating the understanding of the embodiments of the present disclosure, and do not limit the technical solutions of the present disclosure.

The division of the method into the operations described above is just for clarity of the description. When the method is implemented, the operations may be combined into one operation or some of the operations may be further divided into several operations, and all those operations are within the scope of the present disclosure as long as the operations include the same logical relationship. Without changing the core design of the algorithms and the processes, any insignificant modification added to the algorithms and the processes or any insignificant design introduced to the algorithms and the processes is within the scope of the present disclosure.

Figure 7:
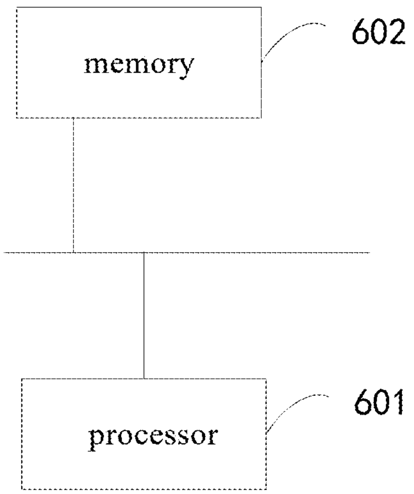
FIG. 7 is a schematic structural diagram of an O-RU according to an embodiment of the present disclosure.

The embodiments of the present disclosure further provide an O-RU. As shown in FIG. 7, the O-RU includes: at least one processor 601; and a memory 602 communicating with and connected to the at least one processor 601. The memory stores instructions executable by the at least one processor, and the instructions are executed by the at least one processor to cause the at least one processor to perform the message processing method according to the above embodiments.

The memory 602 and processor 601 are connected by a bus, the bus may include any amount of interconnected buses and bridges, and the buses connect various circuits of one or more of processors 601 and the memory 602. The bus may also connect various other circuits such as a peripheral device, a voltage regulator, and a power management circuit, which is well known in the existing technology and thus will not be further described here. A bus interface provides an interface between the bus and a transceiver. The transceiver may be one element or a plurality of elements such as a plurality of receivers and a plurality of transmitters, and provides a unit for communicating with various other devices on a transmission medium. Data processed by the processor 601 is transmitted on a wireless medium via an antenna. Furthermore, the antenna receives data and transmits the data to the processor 601.

The processor 601 is configured to manage the bus and general processing, and may also perform various functions including timing, peripheral interface, voltage regulation, power management and other control functions. The memory 602 may be configured to store data used by the processor 601 when performing operations.

The embodiments of the present disclosure further provide a computer-readable storage medium storing a computer program. When executed by a processor, the computer program implements the above method embodiments.

That is, as can be understood by those of ordinary skill in the art, implementation of all or part of the operations of the method described in the above embodiments may be achieved by a program instructing related hardware, and the program is stored in a storage medium and includes several instructions to enable a device (which may be a single chip, a chip, etc.) or a processor to perform all or part of the operations of the method described in each embodiment of the present application. The above storage medium includes: a Universal Serial Bus Flash Disk (a USB flash disk), a mobile hard disk, a Read-Only Memory (ROM), an RAM, a magnetic disk, an optical disc, or various media capable of storing program codes.

It should be understood by those of ordinary skill in the art that the above implementations are specific embodiments of the present disclosure, and various changes in forms and details may be made to the implementations without departing from the spirit and scope of the present disclosure.

What is claimed is:

1. A message processing method applied to an Open Radio Access Network Radio Unit (O-RU), comprising:
 obtaining frequency-domain in-phase quadrature (IQ) data according to uplink data received by an antenna, and storing the frequency-domain IQ data in a preset storage space;
 receiving a control plane message issued by an Open Radio Access Network Distributed Unit (O-DU), analyzing the control plane message to obtain a control plane parameter, and caching the control plane parameter in a queue corresponding to the control plane parameter in a queue group; wherein M queues in the queue group are respectively used for storing control plane parameters of M symbols and the M symbols are in one-to-one correspondence with the M queues;
 sequentially reading cached control plane parameters, and generating a sequence of user plane message transmission scheduling commands according to the read control plane parameters;
 reading the frequency-domain IQ data from the storage space according to the sequence of the user plane message transmission scheduling commands; and
 obtaining an uplink user plane message to be sent according to the read frequency-domain IQ data, and sending the uplink user plane message to the O-DU.

2. The message processing method of claim 1, wherein the O-RU comprises a plurality of banks, each of the plurality of banks is provided with the queue group, and caching the control plane parameter in the queue corresponding to the control plane parameter comprises:
 determining a bank where the control plane parameter needs to be stored;
 acquiring a maximum subcarrier interval among subcarrier intervals of all antenna carriers within the bank where the control plane parameter needs to be stored;
 obtaining a slot serial number, a subcarrier interval of an antenna carrier of the control plane parameter, and an antenna carrier symbol serial number, according to the control plane parameter;
 obtaining an amount of symbols contained in a slot according to acquired management plane configuration information;
 obtaining a numbered address of the queue in the queue group provided in the bank where the control plane parameter needs to be stored, according to the maximum subcarrier interval, the slot serial number, the subcarrier interval of the antenna carrier of the control plane parameter, the antenna carrier symbol serial number, and the amount of the symbols contained in the slot; and
 caching the control plane parameter in the queue corresponding to the numbered address.

3. The message processing method of claim 2, wherein obtaining the numbered address of the queue in the queue group provided in the bank where the control plane parameter needs to be stored, according to the maximum subcarrier interval, the slot serial number, the subcarrier interval of the antenna carrier of the control plane parameter, the antenna carrier symbol serial number, and the amount of the symbols contained in the slot, comprises:
 calculating the numbered address of the queue by the following formula:

$$\text{carrier\_fifo\_addr} = slotId * symNum + \text{max\_scs}/\text{carrier\_scs} * (symId + 1/2)$$

where carrier_fifo_addr is the calculated numbered address of the queue, slotId is the slot serial number, symNum is the amount of the symbols contained in the slot, max_scs is the maximum subcarrier interval, carrier_scs is the subcarrier interval of the antenna carrier of the control plane parameter, and symId is the antenna carrier symbol serial number.

4. The message processing method of claim 1 wherein analyzing the control plane message to obtain the control plane parameter comprises:
 analyzing a common message header in the control plane message according to byte bit positions through a hardware circuit in the O-RU to obtain the control plane parameter in the common message header; wherein the control plane parameter in the common header comprise: timing information, an amount of sections, and a section type; and
 analyzing each section and extension field information in the control plane message according to different message types, based on to the section type and the amount of sections, to obtain the control plane parameter in each section and the extension field information;
 or
 performing message field analysis according to a message structure of the control plane message through a CPU soft core in the O-RU to obtain the control plane parameter.

5. The message processing method of claim 1, wherein the O-RU comprises a plurality of banks, and reading the cached control plane parameters comprises: for each of the cached control plane parameters,
 determining a bank where the control plane parameter is stored;
 determining a reference timing of the bank where the control plane parameter is stored, according to an air interface timing and a link transmission delay of the bank where the control plane parameter is stored; and
 reading the cached control plane parameter according to the reference timing.

6. The message processing method of claim 1, wherein sequentially reading the frequency-domain IQ data from the storage space according to the sequence of the user plane message transmission scheduling commands comprises:
 for each of the user plane message transmission scheduling commands, obtaining a start serial number of a Physical Resource Block (PRB), an amount of Resource Blocks (RBs) in the PRB, and a pre-configured regional address of an antenna carrier in the storage space, according to the user plane message transmission scheduling command;
 calculating a storage address of the PRB in the storage space according to the start serial number of the PRB, the amount of the RBs in the PRB, and the pre-configured regional address of the antenna carrier in the storage space; and
 reading the frequency-domain IQ data from the storage address of the PRB in the storage space.

7. The message processing method of claim 6, wherein calculating the storage address of the PRB in the storage space according to the start serial number of the PRB, the amount of the RBs in the PRB, and the pre-configured regional address of the antenna carrier in the storage space comprises:

in a case where a data length corresponding to the amount of the RBs exceeds a maximum Ethernet message length, performing application layer slicing to split the control plane parameter into a plurality of control plane sub-parameters, and recalculating a start serial number of a PRB of each slice and an amount of RBs in the PRB of each slice; and calculating the storage address of the PRB in the storage space according to the recalculated start serial number of the PRB of each slice, the recalculated amount of the RBs in the PRB of each slice, and the pre-configured regional address of the antenna carrier in the storage space.

8. The message processing method of claim 1, wherein the control plane parameter comprises: a compression mode and a compression bit width of each section; and obtaining the uplink user plane message to be sent according to the read frequency-domain IQ data comprises:

performing compression processing on the read frequency-domain IQ data according to the compression mode and the compression bit width of each section to obtain compressed IQ data; and obtaining the uplink user plane message to be sent according to the compressed IQ data.

9. The message processing method of claim 1, wherein the O-RU comprises a plurality of Open Radio Access Network (ORAN) processing channels, each of the plurality of ORAN processing channels comprises a plurality of banks and supports configurations of a plurality of antennas, and each of the plurality of antennas at least supports a processing capability of carriers from 5M bandwidth to 100M bandwidth.

10. The message processing method of claim 9, wherein each of the plurality of ORAN processing channels supports transmission of data of multiple systems, and the data of multiple systems at least comprise any combination of:

Long Term Evolution (LTE), Narrow Band Internet of Things (NB-IoT), 5G New Radio (NR), and Physical Random Access Channel (Prach).

11. An Open Radio Access Network Radio Unit (O-RU), comprising: at least one processor; and a memory communicating with and connected to the at least one processor; wherein the memory stores instructions executable by the at least one processor, and the instructions are executed by the at least one processor to cause the at least one processor to:

obtain frequency-domain in-phase quadrature (IQ) data according to uplink data received by an antenna, and store the frequency-domain IQ data in a preset storage space;

receive a control plane message issued by an Open Radio Access Network Distributed Unit (O-DU), analyze the control plane message to obtain a control plane parameter, and cache the control plane parameter in a queue corresponding to the control plane parameter in a queue group; wherein M queues in the queue group are respectively used for storing control plane parameters of M symbols and the M symbols are in one-to-one correspondence with the M queues;

sequentially read cached control plane parameters, and generate a sequence of user plane message transmission scheduling commands according to the read control plane parameters;

read the frequency-domain IQ data from the storage space according to the sequence of the user plane message transmission scheduling commands; and obtain an uplink user plane message to be sent according to the read frequency-domain IQ data, and send the uplink user plane message to the O-DU.

12. A non-transient computer-readable storage medium storing a computer program which, when executed by a processor, causes the processor to:

obtain frequency-domain in-phase quadrature (IQ) data according to uplink data received by an antenna, and store the frequency-domain IQ data in a preset storage space;

receive a control plane message issued by an Open Radio Access Network Distributed Unit (O-DU), analyze the control plane message to obtain a control plane parameter, and cache the control plane parameter in a queue corresponding to the control plane parameter in a queue group; wherein M queues in the queue group are respectively used for storing control plane parameters of M symbols and the M symbols are in one-to-one correspondence with the M queues;

sequentially read cached control plane parameters, and generate a sequence of user plane message transmission scheduling commands according to the read control plane parameters;

read the frequency-domain IQ data from the storage space according to the sequence of the user plane message transmission scheduling commands; and obtain an uplink user plane message to be sent according to the read frequency-domain IQ data, and send the uplink user plane message to the O-DU.

* * * * *